United States Patent
Wade

(10) Patent No.: US 8,356,587 B2
(45) Date of Patent: Jan. 22, 2013

(54) PCV VALVE GUIDE

(75) Inventor: Tim Wade, Rochester Hills, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 294 days.

(21) Appl. No.: 10/229,414

(22) Filed: Aug. 28, 2002

(65) Prior Publication Data

US 2003/0213479 A1 Nov. 20, 2003

Related U.S. Application Data

(60) Provisional application No. 60/316,009, filed on Aug. 30, 2001.

(51) Int. Cl.
*F02B 25/06* (2006.01)
(52) U.S. Cl. ......................... 123/574; 137/542
(58) Field of Classification Search .......... 123/572–574, 123/41.86; 137/542, 543 E
See application file for complete search history.

(56) References Cited

U.S. PATENT DOCUMENTS

| | | | | |
|---|---|---|---|---|
| 3,359,960 A | * | 12/1967 | Pittsley | 123/574 |
| 3,659,573 A | * | 5/1972 | Bennett | 123/574 |
| 3,766,898 A | * | 10/1973 | McMullen | 123/574 |
| 3,844,310 A | * | 10/1974 | Brindisi | 137/557 |
| 4,506,695 A | * | 3/1985 | Kuypers | 137/223 |
| 4,625,703 A | * | 12/1986 | Otto et al. | 123/574 |
| 4,905,657 A | * | 3/1990 | Betterton et al. | 123/574 |
| 5,921,276 A | * | 7/1999 | Lam et al. | 137/514.7 |

* cited by examiner

*Primary Examiner* — Marguerite McMahon
(74) *Attorney, Agent, or Firm* — Carlson, Gaskey & Olds PC

(57) ABSTRACT

A positive crankcase ventilation valve assembly including a housing having a fluid inlet and outlet. A poppet valve is arranged in the housing between the fluid inlet and outlet and is movable in a axial direction between a plurality of positions. The positions respectively define a plurality of fluid flow rates. A plurality of ribs extend radially from either the poppet valve and the housing in an axial direction. The ribs define a bearing surface between the housing and the poppet valve. In this manner, the poppet valve is supported within the housing with a reduced bearing surface area while aligning the poppet valve relative to the housing throughout its movement between the positions. In another embodiment, the poppet valve is eliminated to prevent problems associated with an improperly operating poppet valve. A diaphragm is arranged in the housing between the fluid inlet and outlet. The diaphragm has an orifice, which may be defined by a hole and a plurality of slots extending outwardly from the hole, defining first and second areas, respectively, in first and second positions. The first and second positions respectively define first and second fluid flow rates. The diaphragm moves axially in response to pressure fluctuations on the valve, which changes the area of the orifice to vary the flow rate through the orifice.

2 Claims, 3 Drawing Sheets

PCV VALVE GUIDE

RELATED APPLICATIONS

The application claims priority to U.S. Provisional Application No. 60/316,009, which was filed on Aug. 30, 2001.

BACKGROUND OF THE INVENTION

The present invention relates to positive crankcase ventilation (PCV) valve assemblies, and more particularly, the invention relates to the mechanism controlling the flow through the PCV valve.

PCV valve assemblies are used to vent unburned combustion gases, which blows by the piston rings and into the engine crankcase, to the intake manifold to be burned. Release of pressure within the crankcase and burning the unburned combustion gases are critical to obtain desirable engine operation and emissions. Numerous PCV valve actuation devices for opening and closing the valve have been proposed, some of which do not provide valve control to the degree desired.

Some PCV valve assemblies incorporate a poppet valve that moves axially within a valve housing between positions to vary the flow through the PCV valve. The valve assembly is subject to vibrations from the vehicle and engine, which may inhibit the proper operation of the valve. For example, a poppet valve body may engage an inner surface of the housing as it moves between the positions. The vibrations may cause the poppet to be skewed along its axis as it moves between the positions thereby binding up in an undesired position due to the large contact surface area between the valve and the housing. As a result, the desired amount of flow may not be provided through the PCV valve and an undesirable noise may occur from the malfunctioning valve assembly. Therefore, what is needed is an improved valve control device providing more consistent operation of the valve to obtain the desired flow through the PCV valve.

SUMMARY OF THE INVENTION AND ADVANTAGES

The present invention provides a positive crankcase ventilation valve assembly including a housing having a fluid inlet and outlet. A poppet valve is arranged in the housing between the fluid inlet and outlet and is movable in a axial direction between a plurality of positions. The positions respectively define a plurality of fluid flow rates. A plurality of ribs extend radially from either the poppet valve and the housing in an axial direction. The ribs define a bearing surface between the housing and the poppet valve. In this manner, the poppet valve is supported within the housing with a reduced bearing surface area while aligning the poppet valve relative to the housing throughout its movement between the positions.

In another embodiment, the poppet valve is eliminated to prevent problems associated with an improperly operating poppet valve. A diaphragm is arranged in the housing between the fluid inlet and outlet. The diaphragm is movable in an axial direction between first and second positions. The diaphragm has an orifice, which may be defined by a hole and a plurality of slots extending outwardly from the hole defining first and second areas, respectively, in first and second positions. The first and second positions respectively define first and second fluid flow rates. The diaphragm moves axially in response to pressure fluctuations on the valve, which changes the area of the orifice to vary the flow rate through the orifice.

Accordingly, the above invention provides an improved valve control device providing more consistent operation of the valve to obtain the desired flow through the PCV valve.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
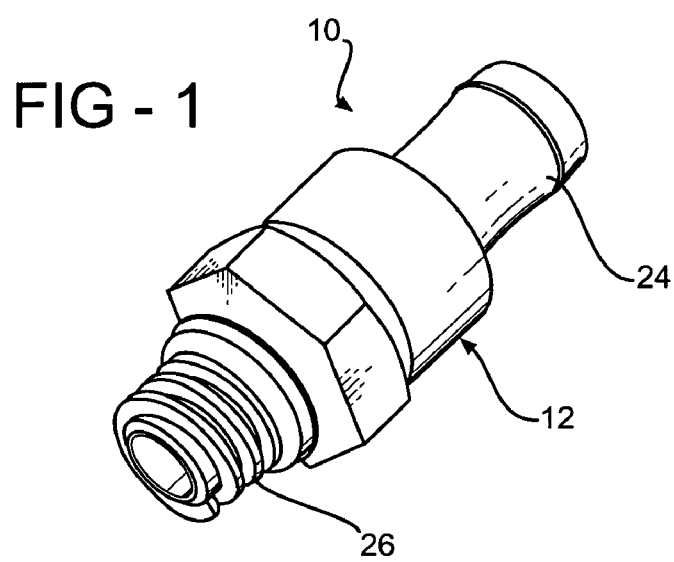
FIG. 1 is a perspective view of a PCV valve.
Figure 2:
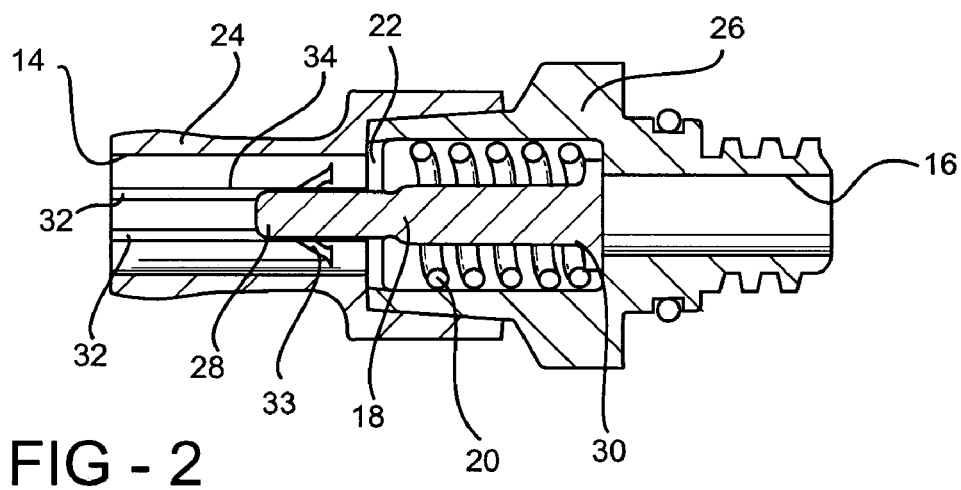
FIG. 2 is a cross-sectional view of the PCV valve shown in FIG. 1.
Figure 3:
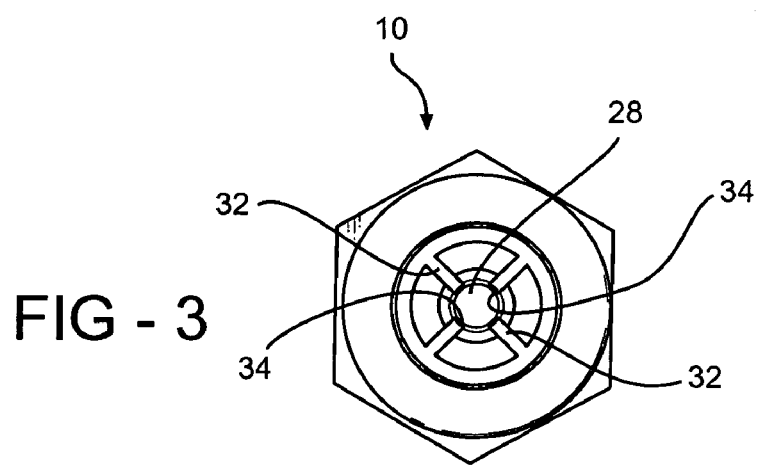
FIG. 3 is an end view of the PCV valve shown in FIG. 2.
Figure 4:
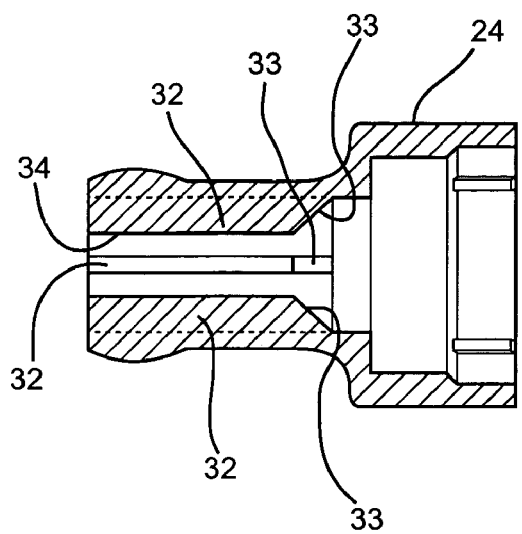
FIG. 4 is a cross-sectional view of the first housing portion of the PCV valve shown in FIG. 2.
Figure 5:
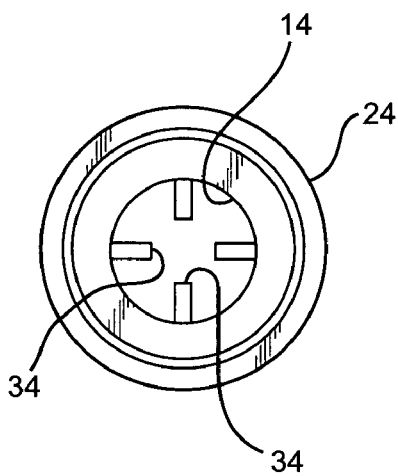
FIG. 5 is an end view of the first housing portion shown in FIG. 4.

A PCV valve is shown at 10 in FIG. 1. The PCV valve 10 includes a housing 12 having an inlet 14 and an outlet 16 with a fluid passage arranged between the inlet 14 and outlet 16. A poppet valve 18 is arranged in the housing 12 between the inlet 14 and outlet 16. A spring 20 is disposed within the housing 12 and biases the poppet valve 18 to a desired position. In response to a pressure change acting on the poppet valve 18, the spring 20 becomes compressed, permitting increased flow through the valve 10. An orifice plate 22 may be arranged between first 24 and second 26 housing portions to define a flow rate through the valve 10 in conjunction with the poppet valve 18.

Figure 6:
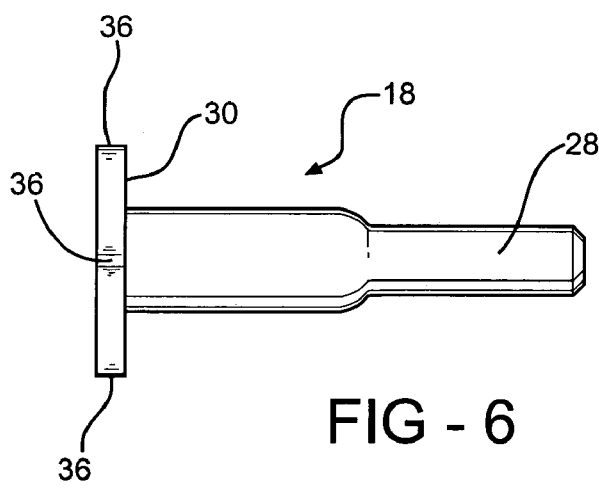
FIG. 6 is a side view of the poppet valve shown in FIG. 2.
Figure 7:
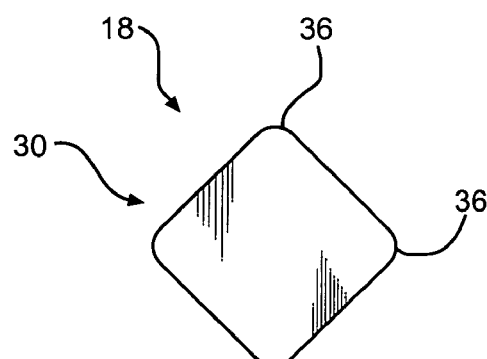
FIG. 7 is an end view of the second portion of the poppet valve shown in FIG. 6.

To ensure smooth and uninhibited travel of the poppet valve 18 between positions and to limit the effects of vibration on the PCV valve 10, specialized bearing surfaces between the poppet valve 18 and the housing 12 may be utilized, as best shown in FIGS. 2-5. The poppet valve 18 may include first 28 and second 30 poppet portions. Ribs 32 may extend inwardly from the first housing portion 24 to support the first poppet portion 28 by bearing surfaces 34 which define the contact area between the poppet valve 18 and the housing 12. The ribs 32 may include tapered leading edges 33 to facilitate insertion of the poppet valve 18 into the first housing portion 24 during assembly of the valve 10. As best shown in FIGS. 6 and 7, the second poppet portion 30 may include a head with corners 36 defining a second set of ribs that engage the second housing portion 26 defining a second bearing surface. In this manner, both the first 28 and second 30 poppet portions are supported in the housing 12 by reduced area bearing surfaces that guide the poppet valve 18 within the housing 12 during travel between positions. The flats between the corners 36 of the head permits partial fluid flow through the valve 10 when the spring 20 biases the poppet valve 18 axially against the housing 12.

Figure 8:
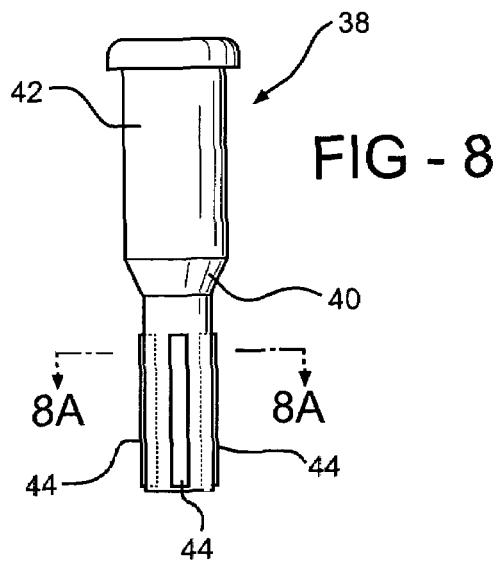
FIG. 8 is a side view of another poppet valve for use with the PCV valve shown in FIG. 1.
Figure 8A:
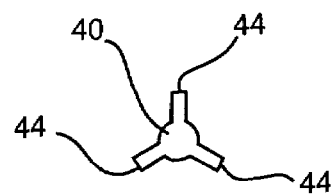
FIG. 8A is a cross-sectional view of the first portion of the poppet valve shown in FIG. 8 taken along lines 8A-8A.

As an alternative to using the ribs 32 extending from the first housing portion 24, the first portion of the poppet valve 38 may include ribs 44 extending from the first poppet portion 40, as shown in FIGS. 8A and 8B. The second poppet portion 42 may include ribs or corners or may be supported by a second housing portion having ribs.

Figure 9:
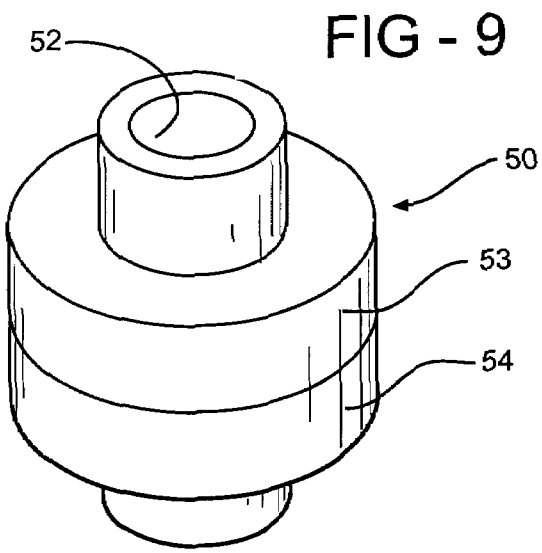
FIG. 9 is a perspective view of another PCV valve.

The problem of poppet valves sticking within the housing is also addressed by the PCV valve 50, shown in FIG. 9. The PCV valve 50 includes an inlet 51 and an outlet 52. The valve 50 includes first 53 and second 54 housing portions secured to one another. A first 56 and second 58 diaphragm may be retained between the housing portions 53 and 54, which together define the flow rate through the valve 50. A seal 60 may be used between the diaphragms 56 and 58 to retain and actually locate the diaphragms within the housing portions 53 and 54.

Figure 10:
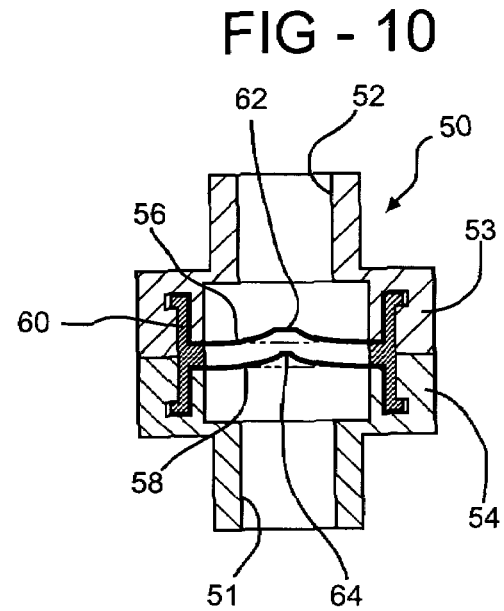
FIG. 10 is a cross-sectional view of the PCV valve shown in FIG. 9.
Figure 11:
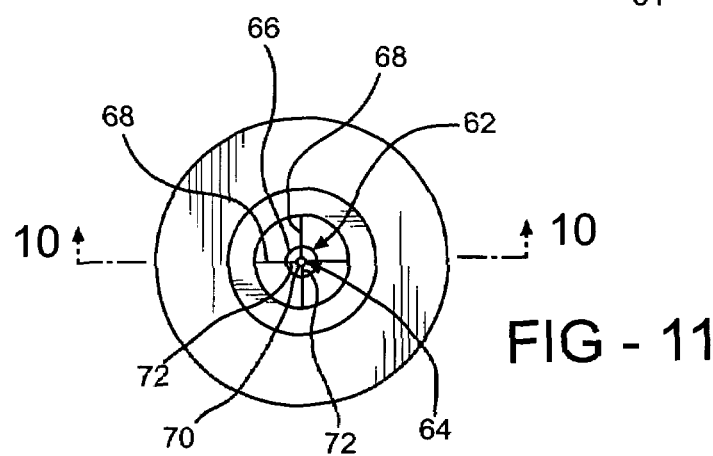
FIG. 11 is an end view of the PCV valve shown in FIG. 10.

The diaphragm deflects in response to pressure fluctuations. The fun 56 and second 58 diaphragms respectively include first 62 and second 64 orifices that define the flow rates for the various positions of the diaphragms. The diaphragms have different orifices sizes and respond differently to pressure fluctuations on the valve 50. The first orifice 62 is defined by a hole 66 having slots 68 extending from the hole 66, as best shown in FIG. 11. The second orifice 64 includes a hole 70 with slots 72 extending from the hole 70. The slots 68 and 70 better enable the area defined by the orifices to be varied as the diaphragms flex between positions. In one position, the diaphragms have a frustoconical cross-section, as best shown in FIG. 10. The first diaphragm 56 is shown in a flatter position than the second diaphragm 58. As the diaphragms flatten, the area of the orifice is decreased, thereby decreasing the flow rate through the valve 50. One or more diaphragms may be used in the present invention PCV valve 50.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A positive crankcase ventilation valve assembly comprising:
    a housing having a fluid inlet and a fluid outlet;
    a poppet valve disposed in said housing between said fluid inlet and said fluid outlet and movable in an axial direction to a plurality of positions respectively defining a plurality of fluid flow rates; and
    a plurality of ribs extending radially from one of said poppet valve and said housing in said axial direction, said plurality of ribs defining a bearing surface between said housing and said poppet valve, and wherein said plurality of ribs include a tapered leading edge facilitating insertion of said poppet valve into said housing during assembly.

2. A positive crankcase ventilation valve assembly comprising:
    a housing having a fluid inlet and a fluid outlet;
    a poppet valve disposed in the housing between the fluid inlet and the fluid outlet and movable in an axial direction between a plurality of positions respectively defining a plurality of fluid flow rates; and
    a plurality of ribs extending radially from one of the poppet valve and the housing in the axial direction, the plurality of ribs defining a bearing surface between the housing and the poppet valve, and wherein the plurality of ribs include a leading edge facilitating insertion of the poppet valve into the housing during assembly, wherein the leading edge is tapered.

* * * * *